(12) United States Patent
Zhang et al.

(10) Patent No.: US 7,929,768 B2
(45) Date of Patent: Apr. 19, 2011

(54) CURSIVE HANDWRITING RECOGNITION WITH HIERARCHICAL PROTOTYPE SEARCH

(75) Inventors: Qi Zhang, Redmond, WA (US); Michael T. Black, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/576,137

(22) Filed: Oct. 8, 2009

(65) Prior Publication Data

US 2010/0027889 A1  Feb. 4, 2010

Related U.S. Application Data

(63) Continuation of application No. 11/442,799, filed on May 30, 2006, now Pat. No. 7,620,245.

(51) Int. Cl.
*G06K 9/18* (2006.01)
*G06K 9/00* (2006.01)

(52) U.S. Cl. ........................... 382/186; 382/187

(58) Field of Classification Search .................. None
See application file for complete search history.

(56) References Cited

U.S. PATENT DOCUMENTS

| | | | |
|---|---|---|---|
| 5,940,533 A | 8/1999 | Gentric | |
| 6,289,124 B1 | 9/2001 | Okamoto | |
| 6,393,395 B1 | 5/2002 | Guha et al. | |
| 6,917,709 B2 | 7/2005 | Zelinski | |
| 7,620,245 B2 * | 11/2009 | Zhang et al. | 382/186 |
| 2002/0069220 A1 | 6/2002 | Tran | |
| 2004/0148577 A1 | 7/2004 | Xu et al. | |
| 2006/0033719 A1 | 2/2006 | Leung et al. | |
| 2006/0050962 A1 | 3/2006 | Geiger et al. | |
| 2007/0280536 A1 * | 12/2007 | Zhang et al. | 382/187 |

OTHER PUBLICATIONS

Schomaker, et al.; "L. Schomaker c.s., Abstracts", http://www.ai.rug.nl/~lambert/publications/abstracts.html.
Verga, et al.; "Comparing Natural and Synthetic Training Data for Off-line Cursive Handwriting Recognition", http://www.iam.unibe.ch/~fki/publications/public/VaBu04-002.pdf.
Bortolozzi, et al.; "Recent Advances in Handwriting Recognition", http://www.ppgia.pucpr.br/~soares/download/advances.pdf.
Abdulkader, et al.; "Comparative Classifier Aggregation, Pattern Recognition", 2006, ICPR 2006, 18th Int'l Conference on, vol. 3, p. 156-159.
Notice of Allowance in related U.S. Appl. No. 11/442,799 dated Jul. 8, 2009.

* cited by examiner

*Primary Examiner* — Tom Y Lu
*Assistant Examiner* — Thomas A Conway

(57) ABSTRACT

Various technologies and techniques are disclosed that improve cursive handwriting recognition. Cursive handwriting input is received from a user. The system performs a hierarchical prototype search as part of a recognition operation. A same space search is performed against a mixed database that has both print and cursive samples. A same space search is also performed against a cursive database that has only cursive samples. The results of these two same space searches are merged into a combined alternate list. The combined alternate list is then used as a constraint for the dynamic time warp searches that are performed against the mixed and cursive databases, respectively. The results of the dynamic time warp searches are also merged into a final combined alternate list, and the combined alternate list is used to make a recognition decision regarding the user's handwritten input.

20 Claims, 6 Drawing Sheets

CURSIVE HANDWRITING RECOGNITION WITH HIERARCHICAL PROTOTYPE SEARCH

RELATED APPLICATIONS

This application is a continuation of U.S. patent application Ser. No. 11/442,799, filed on May 30, 2006, entitled "CURSIVE HANDWRITING RECOGNITION WITH HIERARCHICAL PROTOTYPE SEARCH" which is hereby incorporated by reference in its entirety.

BACKGROUND

Pen-enabled devices such as tablet pc's and personal digital assistants often use one or more types of handwriting recognizers to allow users to enter data using the pen. Handwriting recognizers analyze the user's handwriting according to a series of classifiers to determine the most likely match. With prototype/template based matching recognition techniques, the ink segments are compared to ink samples in a database to determine a list of the most likely results. It is often difficult to achieve good handwriting recognition results for cursive handwriting due to the large number of inter and intra person variations (or writing styles) to write the same character. For example, a N stroke character can be written in 1-N strokes (potentially yielding $2^N$ writings). Furthermore, the way strokes are connected can vary drastically from person to person and from character to character. In addition, East Asian languages usually have the order of 10,000 characters (codepoints, or classes), which further complicates the problem. Difficulty also arises in instances where there is uneven data distribution (e.g. much more print training samples than cursive samples), which results in a limited number of cursive samples typically present in prototype databases as compared to the number of print samples.

SUMMARY

Various technologies and techniques are disclosed that improve cursive handwriting recognition. Cursive handwriting input is received from a user. The system performs a hierarchical prototype search as part of a recognition operation that includes same space searches and dynamic time warp searches. A same space search is performed against a mixed database that has both print and cursive samples. A same space search is also performed against a cursive database that has only cursive samples. The results of these two same space searches are merged into a combined alternate list. The combined alternate list is then used as a constraint for the dynamic time warp searches that are performed against the mixed and cursive databases, respectively. The results of the dynamic time warp searches are also merged into a final combined alternate list, and the combined alternate list is used to make a recognition decision regarding the user's handwritten input.

In one implementation, by providing the cursive prototype database trained with cursive samples only, in addition to the mixed database that has both print and cursive samples, the distribution of samples is better balanced for the cursive handwriting recognition operation.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
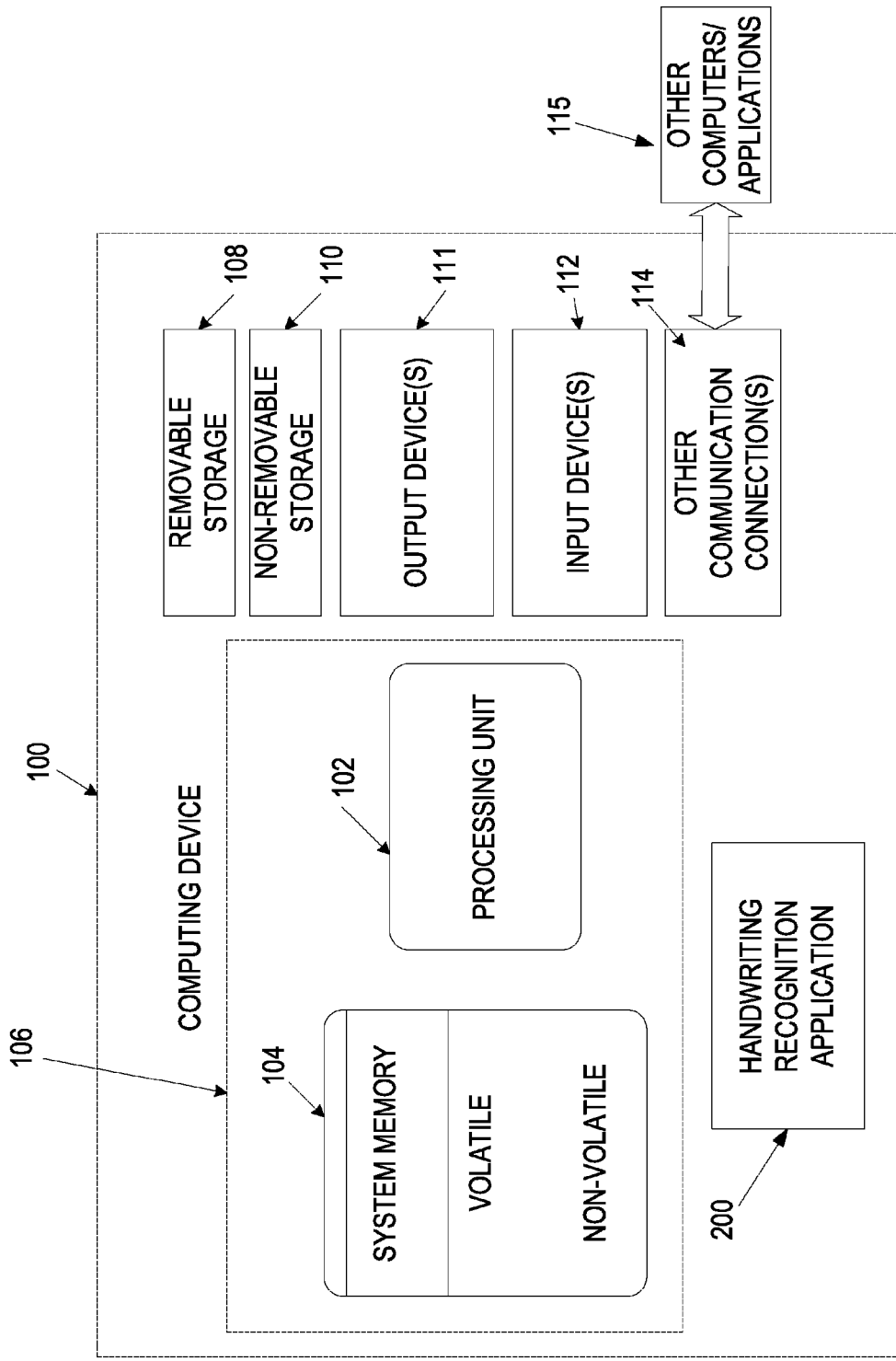
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that improves cursive handwriting recognition, but the system also serves other purposes in addition to these. In one implementation, one or more of the techniques described herein can be implemented as features within a handwriting recognition application, or from any other type of program or service that includes a handwriting recognition feature.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes handwriting recognition application 200. Handwriting recognition application 200 will be described in further detail in FIG. 2.

Figure 2:
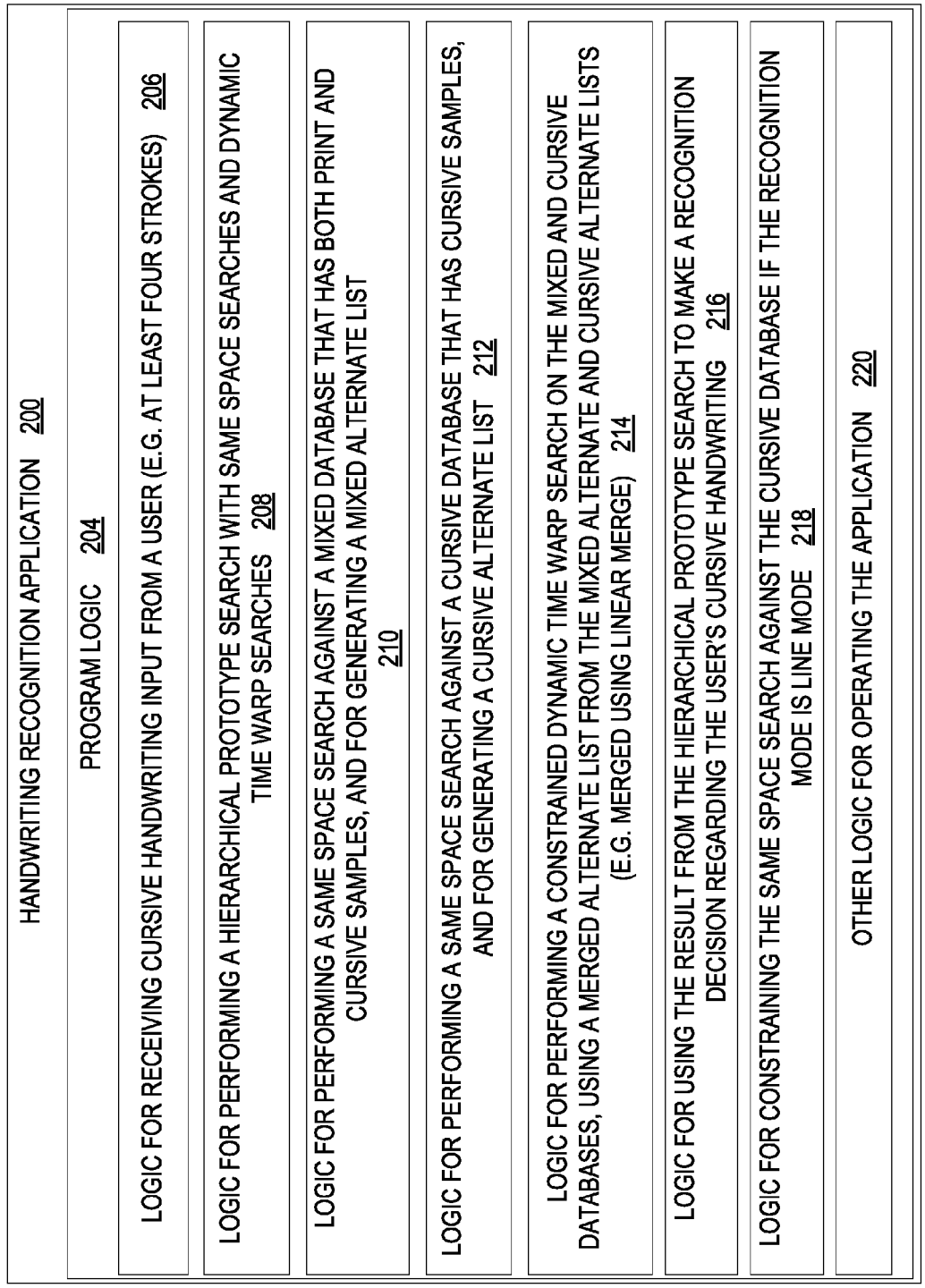
FIG. 2 is a diagrammatic view of a handwriting recognition application of one implementation operating on the computer system of FIG. 1.

Turning now to FIG. 2 with continued reference to FIG. 1, a handwriting recognition application 200 operating on computing device 100 is illustrated. Handwriting recognition application 200 is one of the application programs that reside on computing device 100. However, it will be understood that handwriting recognition application 200 can alternatively or additionally be embodied as computer-executable instructions on one or more computers and/or in different variations than shown on FIG. 1. Alternatively or additionally, one or more parts of handwriting recognition application 200 can be part of system memory 104, on other computers and/or applications 115, or other such variations as would occur to one in the computer software art.

Handwriting recognition application 200 includes program logic 204, which is responsible for carrying out some or all of the techniques described herein. Program logic 204 includes logic for receiving cursive handwriting input from a user (e.g. at least four strokes) 206; logic for performing a hierarchical prototype search with same space searches and dynamic time warp searches 208; logic for performing a same space search against a mixed database that has both print and cursive samples, and for generating a mixed alternate list 210; logic for performing a same space search against a cursive database that has cursive samples, and for generating a cursive alternate list 212; logic for performing a constrained dynamic time warp search on the mixed and cursive databases, using a merged alternate list from the mixed alternate lists and cursive alternate list (e.g. merged using linear merge) 214; logic for using the results from the hierarchical prototype search to make a recognition decision regarding the user's cursive handwriting 216; logic for constraining the same space search against the cursive database if the recognition mode is line mode 218; and other logic for operating the application 220. In one implementation, program logic 204 is operable to be called programmatically from another program, such as using a single call to a procedure in program logic 204.

Figure 3:
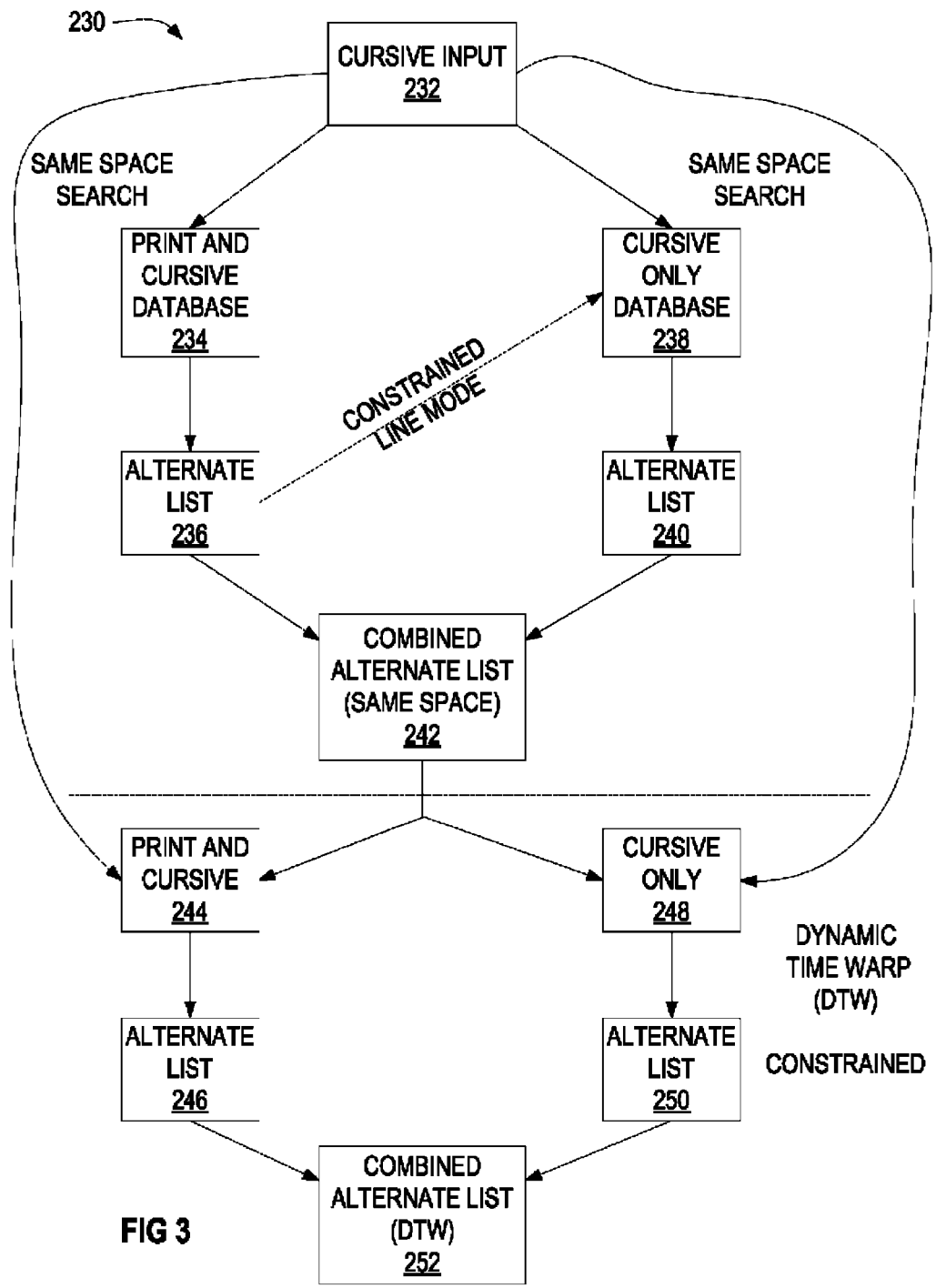
FIG. 3 is a logical diagram for one implementation of the system of FIG. 1.

Turning now to FIGS. 3-6 with continued reference to FIGS. 1-2, the stages for implementing one or more implementations of handwriting recognition application 200 are described in further detail. FIG. 3 is a logical diagram 230 for one implementation handwriting recognition application 200. In one form, the process of FIG. 3 is at least partially implemented in the operating logic of computing device 100. Cursive input is received from a user (stage 232). A same space search is performed against the print and cursive database—e.g. the mixed database (stage 234)—to produce an alternate list of possible matches from the mixed database (stage 236). A same space search is also performed against a cursive only database (stage 238) to produce an alternate list of possible matches from the cursive only database (stage 240). In one implementation, the same space searches are performed against approximately fifty thousand prototypes. In other implementations, more or fewer prototypes are used in the same space searches. The mixed alternate list and the cursive only alternate list are then combined to form a revised alternate list (stage 242).

In one implementation, when the recognition mode is line mode, the second same space search that is run against the cursive only database is run in a constrained mode. In one implementation, the constraint is the alternate list from the mixed database generated in stage 236. This is optional step that only occurs in line mode is represented by the dotted line arrow on FIG. 3. In other modes, such as boxed mode, the full same space search is performed as described previously.

The combined alternate list is used as input to the dynamic time warp searches. In one implementation, there are approximately 10 times N prototypes (e.g. 10×20=200) used in the dynamic time warp searches, with N representing the number of items in the combined alternate list from the same space searches. In other implementations, more or fewer prototypes are used. A constrained dynamic time warp search is performed against the print and cursive (mixed) database (stage 244) to produce a mixed alternate list (stage 246). A constrained dynamic time warp search is also performed against the cursive only database (stage 248) to produce a cursive alternate list (stage 250). The mixed alternate list and the cursive alternate list are merged, forming a combined dynamic time warp alternate list (stage 252). The merged alternate list that results after the same space searches and the dynamic time warp searches is then used to make a handwriting recognition decision.

Figure 4:
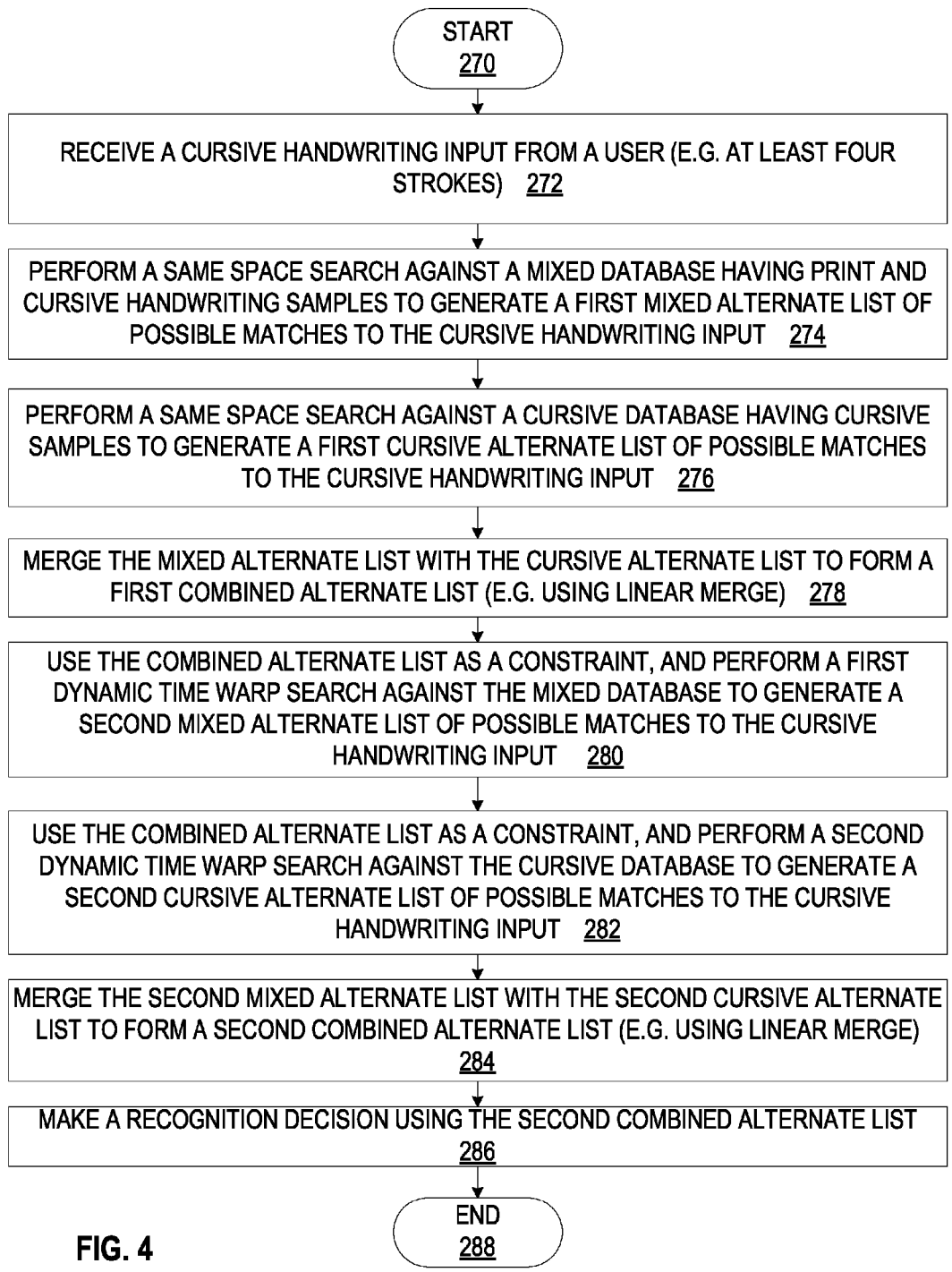
FIG. 4 is a process flow diagram for one implementation of the system of FIG. 1 illustrating the stages involved in improving a cursive handwriting recognition operation.

FIG. 4 illustrates one implementation of the stages involved in improving a cursive handwriting recognition operation. In one form, the process of FIG. 4 is at least partially implemented in the operating logic of computing device 100. The procedure begins at start point 270 with receiving a cursive handwriting input from a user (stage 272). In one implementation, the process works with four or more handwritten strokes. In other implementations, more or fewer strokes can be used. A same space search is performed against a mixed database having print and cursive handwriting samples to generate a first mixed alternate list of possible matches to the cursive handwriting input (stage 274). A same space search is performed against a cursive database having cursive samples to generate a first cursive alternate list of possible matches to the cursive handwriting input (stage 276). The mixed alternate list is merged with the cursive alternate list to form a first combined alternate list (e.g. using linear merge) (stage 278).

Using the combined alternate list as a constraint, the system performs a first dynamic time warp search against the mixed database to generate a second mixed alternate list of possible matches to the cursive handwriting input (stage 280). Using the combined alternate list as a constraint, the system performs a second dynamic time warp search against the cursive database to generate a second cursive alternate list of possible matches to the cursive handwriting input (stage 282). The second mixed alternate list is merged with the second cursive alternate list to form a second combined alternate list (e.g. using linear merge) (stage 284). The system makes a recognition decision using the second combined alternate list (stage 286). The process ends at end point 288.

Figure 5:
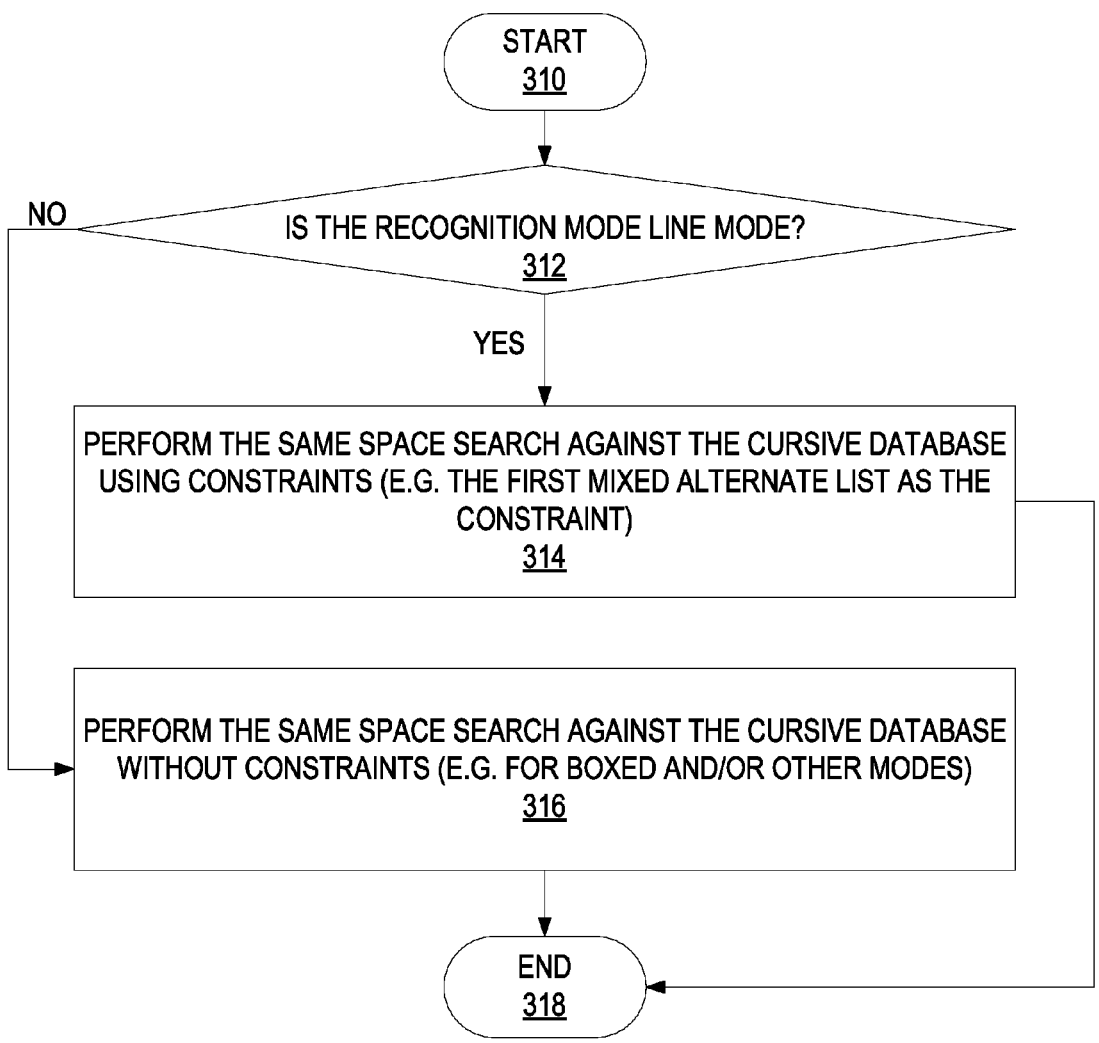
FIG. 5 is a process flow diagram for one implementation of the system of FIG. 1 illustrating the stages involved in performing the second same space search with constraints if the recognition mode is line mode.

FIG. 5 illustrates one implementation of the stages involved in performing the second same space search with constraints if the recognition mode is line mode. In one form, the process of FIG. 5 is at least partially implemented in the operating logic of computing device 100. The procedure begins at start point 310 with the system determining whether the recognition mode is line mode (decision point 312). If the recognition mode is line mode (decision point 312), then the same space search (as described in stage 276 in FIG. 4) is performed against the cursive database using constraints (e.g. the first mixed alternate list as the constraint) (stage 314). If the recognition mode is not line mode, then the same space search is performed against the cursive database without constraints (e.g. for boxed and/or other non-line modes) (stage 316). The process ends at end point 318.

Figure 6:
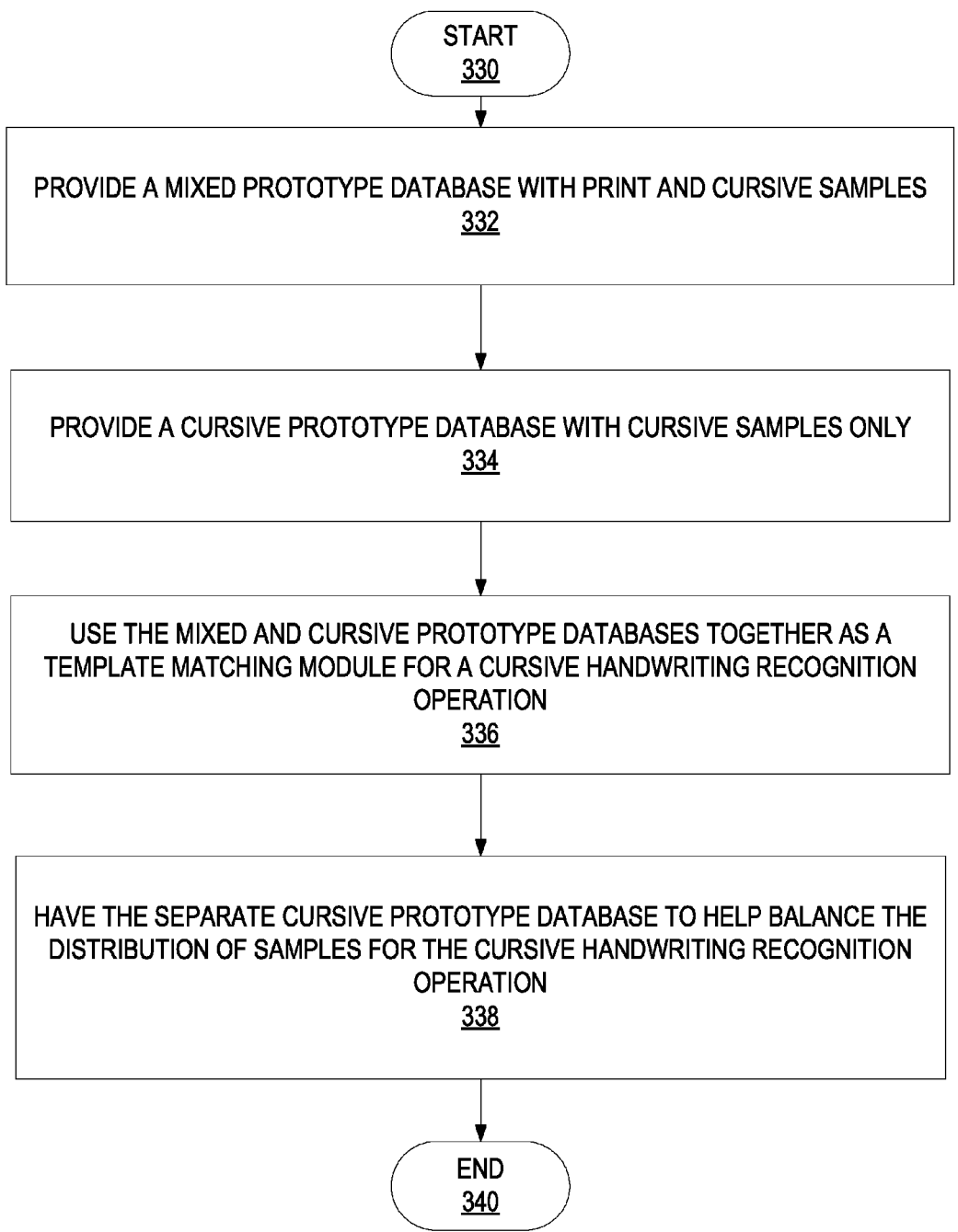
FIG. 6 is a process flow diagram for one implementation of the system of FIG. 1 illustrating the stages involved in using a cursive-only database in addition to a mixed database to improve cursive recognition operations.

FIG. 6 illustrates one implementation of the stages involved in using a cursive-only database in addition to a mixed database to improve cursive handwriting recognition operations. In one form, the process of FIG. 6 is at least partially implemented in the operating logic of computing device 100. The procedure begins at start point 330 with providing a mixed prototype database with print and cursive samples (stage 332). A cursive prototype database with cursive samples only is also provided (stage 334). The system uses the mixed and cursive prototype databases together as a template matching modules for a cursive handwriting recognition operation (stage 336). By having the separate cursive prototype database, the distribution of samples for the cursive handwriting recognition operation is better balanced (stage 338). The process ends at end point 340.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, and/or data layouts as described in the examples discussed herein could be organized differently on one or more computers to include fewer or additional options or features than as portrayed in the examples.

What is claimed is:

1. A method for improving cursive handwriting recognition comprising:
   providing a mixed prototype database trained with print and cursive samples;
   providing a cursive prototype database trained with cursive samples only; and
   using the mixed and cursive prototype databases together as a template matching module for a cursive handwriting recognition operation.

2. The method of claim 1, where the cursive prototype database helps balance a distribution of samples for the cursive handwriting recognition operation.

3. The method of claim 1, the using the mixed and cursive prototype databases together as a template matching module comprising:
   making a recognition decision based upon a combined alternate list generated from one or more same space searches and one or more dynamic time warp searches against the mixed prototype database and the cursive prototype database.

4. The method of claim 1, the method implemented at least in part in an operating logic of a computing device.

5. The method of claim 1, comprising receiving one or more cursive handwriting strokes input from a user.

6. The method of claim 1, comprising generating a first mixed alternate list based upon a first same space search against the mixed prototype database.

7. The method of claim 6, comprising generating a first cursive alternate list based upon a second same space search against the cursive prototype database.

8. The method of claim 7, comprising merging the first mixed alternate list with the first cursive alternate list into a first combined alternate list.

9. The method of claim 8, comprising making a recognition decision based upon the first combined alternate list.

10. A method for improving cursive handwriting recognition comprising:
    providing a mixed prototype database trained with print and cursive samples;
    providing a cursive prototype database trained with cursive samples only; and
    using the mixed and cursive prototype databases together as a template matching module for a cursive handwriting recognition operation, the using the mixed and cursive prototype databases together as a template matching module comprising:
       making a recognition decision based upon a combined alternate list generated from one or more same space searches and one or more dynamic time warp searches against the mixed prototype database and the cursive prototype database.

11. The method of claim 10, comprising:
    determining if a recognition mode is line mode;
    performing one or more same space searches against the cursive prototype database using constraints if a determination is made that the recognition mode is line mode; and
    performing one or more same space searches against the cursive prototype database not using constraints if a determination is made that the recognition mode is not line mode.

12. The method of claim 10, where the cursive prototype database helps balance a distribution of samples for the cursive handwriting recognition operation.

13. The method of claim 10, comprising receiving one or more cursive handwriting strokes input from a user.

14. The method of claim 10, comprising generating a second mixed alternate list based upon a first dynamic time warp search against the mixed prototype database.

15. The method of claim 14, comprising generating a second cursive alternate list based upon a second dynamic time warp search against the cursive prototype database.

16. The method of claim 15, comprising merging the second mixed alternate list with the second cursive alternate list into a second combined alternate list.

17. The method of claim 16, comprising making a recognition decision based upon the second combined alternate list.

18. A computer-readable device comprising processor-executable instructions configured to perform actions comprising: providing a mixed prototype database trained with print and cursive samples; providing a cursive prototype database trained with cursive samples only; and using the mixed and cursive prototype databases together as a template matching module for a cursive handwriting recognition operation, the using the mixed and cursive prototype databases together as a template matching module comprising: making a recognition decision based upon a combined alternate list generated from one or more same space searches and one or more dynamic time warp searches against the mixed prototype database and the cursive prototype database.

19. The computer-readable device of claim 18, the actions comprising: determining if a recognition mode is line mode.

20. The computer-readable device of claim 19, the actions comprising: performing one or more same space searches against the cursive prototype database using constraints if a determination is made that the recognition mode is line mode; and performing one or more same space searches against the cursive prototype database not using constraints if a determination is made that the recognition mode is not line mode.

* * * * *